United States Patent [19]

Strenzke

[11] Patent Number: 5,533,867
[45] Date of Patent: Jul. 9, 1996

[54] METHOD AND HYDROSTATIC DRIVE SYSTEM FOR OPERATING AN ADJUSTABLE HYDROSTATIC PUMP

[75] Inventor: Hilmar Strenzke, Aschaffenburg, Germany

[73] Assignee: Linde Aktiengesellschaft, Germany

[21] Appl. No.: 233,072

[22] Filed: Apr. 26, 1994

[30] Foreign Application Priority Data

Apr. 26, 1993 [DE] Germany .................... 43 13 597.8

[51] Int. Cl.$^6$ ........................................ F04B 49/08
[52] U.S. Cl. ..................... 417/53; 417/218; 60/450
[58] Field of Search ............................ 417/213, 218, 417/53; 60/450

[56] References Cited

U.S. PATENT DOCUMENTS

| | | | |
|---|---|---|---|
| 4,067,664 | 1/1978 | Robeller | 417/218 |
| 4,325,677 | 4/1982 | Nonnenmacher | 417/218 |
| 4,518,322 | 5/1985 | Nonnenmacher | 417/218 |
| 4,710,106 | 12/1987 | Iwata et al. | 417/218 |
| 4,892,465 | 1/1990 | Born et al. | 417/218 |
| 4,976,106 | 12/1990 | Noerskau et al. | 60/452 |
| 5,190,445 | 3/1993 | Ikari | 417/218 |
| 5,203,678 | 4/1993 | Sugiyama et al. | 417/218 |
| 5,326,230 | 7/1994 | Fischer et al. | 417/218 |

FOREIGN PATENT DOCUMENTS 2042219  9/1980  United Kingdom .................. 417/218

*Primary Examiner*—Peter Korytnyk
*Attorney, Agent, or Firm*—Webb Ziesenheim Bruening Logsdon Orkin & Hanson

[57] ABSTRACT

A hydrostatic drive system including an adjustable pump and a hydraulic fluid delivery line connecting the outlet of the pump to the inlet of a hydraulic energy consuming device. An adjustable throttle is located in the hydraulic fluid delivery line between the outlet of the pump and the inlet of the hydraulic energy consuming device. A load-sensing controller is connected to the hydraulic fluid delivery line on opposite sides of the throttle and is operatively connected to the pump to determine the displacement of the pump and to reproduce the pressure drop at the throttle. The load-sensing controller coordinates the pressure difference, $\Delta p$, and the size of the opening of the throttle in accordance with the set speed of movement of the hydraulic energy consuming device.

10 Claims, 2 Drawing Sheets

METHOD AND HYDROSTATIC DRIVE SYSTEM FOR OPERATING AN ADJUSTABLE HYDROSTATIC PUMP

BACKGROUND OF THE INVENTION

1. Field of the Invention

The invention is directed to a method for operating an adjustable hydrostatic pump in accordance with the size of the opening of a throttle located in a hydraulic fluid delivery line connecting the pump and a hydraulic energy consuming device. The pressure drop, $\Delta p$, is measured at the throttle and the measured value is transmitted to a load-sensing controller which adjusts the displacement of the hydrostatic pump to a value at which the delivery pressure of the pump exceeds the pressure at the hydraulic energy consuming device by an amount which is determined by the system. The amount of the pressure difference is controllable. The invention includes a hydrostatic drive system which includes the adjustable hydrostatic pump and at least one hydraulic energy consuming device connected to the pump by a hydraulic fluid delivery line for performing the method of the invention. An adjustable throttle is located in the hydraulic fluid delivery line between the pump and the consuming device and a load-sensing controller is connected to the fluid delivery line on opposite sides of the throttle to reproduce the pressure drop at the throttle and to adjust the displacement of the pump.

Adjustable hydrostatic pumps which are operated on the load-sensing principle are known in an open circuit in the mobile sector (for example, in construction equipment). These pumps operate with a fixed pressure difference, $\Delta p$, and an arbitrarily controlled size of the opening of the throttle. The size of the opening of the throttle, which may be a part of a valve of a hydraulic energy consuming device, determines the speed of movement of the consuming device in the mobile sector.

The throttle is opened a small amount for slow movement of the hydraulic energy consuming device and pressure builds up in the hydraulic fluid delivery line between the throttle and the hydraulic energy consuming device which is initially stationary due to friction. The load-sensing controller maintains the pressure difference constant at the pre-set value and increases the delivery rate from the pump. Depending upon the coefficient of friction at the hydraulic energy consuming device, the delivery rate from the pump can increase to a level which is much higher than the level necessary to achieve the desired speed of movement of the hydraulic energy consuming device. Under these circumstances, an undesirable jerking motion of the hydraulic energy consuming device can take place when movement of the consuming device is initiated and the starting speed of the consuming device will be higher than the speed which has actually been set.

The throttle is opened a large amount for rapid movement of the hydraulic energy consuming device, and the pre-set pressure difference, $\Delta p$, drops considerably. This is desirable because the loss of power eliminated by the throttle becomes small at high volume flow rates (otherwise the result would be, for example, a 5% loss of power with an operating pressure of 400 bar and a pressure difference, $\Delta p$, of 20 bar). However, departure from the range of control of the load-sensing controller is disadvantageous.

The requirements are different when using an adjustable hydrostatic pump in the industrial sector (for example, a hydraulic press) wherein variable displacement pumps, i.e., pumps with which a particular control command which is always associated with a defined displacement of the pump and, thus, a particular speed of movement of the hydraulic energy consuming device, are normally used. Variable displacement pumps require movement feedback (or displacement feedback) and a special control valve system. Practically no loss of power occurs when variable displacement pumps are used. In the industrial sector, rapid movements of the hydraulic energy consuming device are desired. The use of a pump controlled by the load-sensing method in the industrial sector is not possible because the initial low speeds of movement of the hydraulic energy consuming device are associated with jerky movements and high speeds of movement of the hydraulic energy consuming device result in departures from the range of control.

Therefore, a pump manufacturer supplying both the mobile sector and the industrial sector must have a different pump with the same displacement available for each application.

Jerking movements with slow movements of the hydraulic energy consuming device can be largely prevented with a method of this type for operating an adjustable hydrostatic pump, such a method is also referred to as load-sensing control with fine-mode control and is disclosed in U.S. Pat. No. 4,976,106, which is incorporated herein by reference. Here, the pressure difference, $\Delta p$, is reduced by sensing a value in a load feedback line. As a result, the equilibrium at the load-sensing controller moves in a direction to reduce the displacement of the pump while the size of the opening of the throttle remains the same which results in increased fine controllability. When the hydraulic energy consuming device connected to the pump is manually controlled by a hand lever to vary the size of the opening of the throttle, half the quantity of the hydraulic fluid can be controlled over the entire adjusting range of the hand lever, for example, if the sensing valve is designed accordingly.

Thus, through the fine-mode control, the volume flow to the hydraulic energy consuming device is less when the pressure difference, $\Delta p$, is reduced, so that less movement occurs at the hydraulic energy consuming device with the same size opening of the throttle.

However, with a fast movement of the hydraulic energy consuming device, i.e., with the fine-mode control switched off, pumps under load-sensing control still have the drawback, already mentioned, that when the pressure difference, $\Delta p$, decreases, the load-sensing control, i.e., the actual volume flow control, no longer functions. The speed of movement of the hydraulic energy consuming device is not subject to disturbance control because the pump remains continuously set to maximum displacement. This means that fluctuating drive revolutions lead to fluctuating speeds of movement of the consuming device. This is a detriment to using a hydrostatic pump with load-sensing control in the industrial sector.

SUMMARY OF THE INVENTION

The underlying object of the present invention is to provide a method and a hydrostatic drive system providing for good, fine control at low speeds of movement of a hydraulic energy consuming device, and also providing for the maintenance of the load-sensing control at high speeds of movement of a hydraulic energy consuming device with a minimal loss of power.

The objects according to the invention are achieved by determining the speed of movement of the hydraulic energy consuming device as a set value and controlling the pressure difference and the size of the opening of the throttle in combination depending upon the set value. A certain pressure difference and a certain size of the throttle opening are automatically associated with one another such that good, fine control is obtained at low speeds of movement and minimal loss of power occurs at high speeds of movement. Thus, a special fine-mode control is combined with the control of the valve of the hydraulic energy consuming device, i.e., control of the size of the opening of the throttle in a valve of the hydraulic energy consuming device. The pressure difference, $\Delta p$, and the size of the opening of the throttle are continuously adjusted relative to one another so that extreme, fine control of the hydraulic energy consuming device is obtained and load-sensing control does not decrease even at high speeds of movement of the hydraulic energy consuming device while the loss of power is maintained low. In the fine control range, the pressure difference, $\Delta p$, is large and the size of the opening of the throttle is small. At high speeds of movement of the hydraulic energy consuming device, the pressure difference, $\Delta p$, is small and the size of the opening of the throttle is large. Thus, a pump originally designed as a load-sensing control pump can be used like a variable displacement pump without any operating disadvantage relative to a variable displacement pump. A pump operated in accordance with the method of the invention requires no movement or displacement feedback and no special valve system designed for a variable displacement pump. This is advantageous because the same pump can be used in both the mobile sector and the industrial sector.

According to one embodiment of the method of the invention, the set value for the speed of movement of the hydraulic energy consuming device is transmitted to an electronic control unit and the size of the opening of the throttle and the load-sensing controller are controlled by signals from the electronic control unit. The electronic control unit provides a simple way of reciprocally associating pressure difference, $\Delta p$, and the size of the opening of the throttle according to the working point. The control characteristics which include the interaction of the two parameters, pressure difference, $\Delta p$, and the size of the opening of the throttle, are stored in the electronic control unit so that a specific control characteristic is determined according to the set value for the speed of movement of the hydraulic energy consuming device.

In a second embodiment of the invention, the method includes manually controlling the size of the opening of the throttle. In this embodiment, the size of the opening of the throttle is determined by a sensor and is communicated to an electronic control unit and the pressure difference, $\Delta p$, at the load-sensing controller is controlled by signals from the electronic control unit. In its simplest form, the sensor is a two-way switch which indicates only whether the size of the opening of the throttle is large or small.

With a hydrostatic drive system according to the invention, the pressure difference, $\Delta p$, and the size of the opening of the throttle can be controlled in combination depending upon the speed of movement of the hydraulic energy consuming device which is determined as a set value. A certain pressure difference and a certain opening size can be automatically associated with one another such that good, fine control is obtained at low speeds of movement of the hydraulic energy consuming device and minimal loss of power occurs at high speeds of movement of the hydraulic energy consuming device.

In a further development of the invention, the electronic control unit which controls the size of the opening of the throttle and the pressure difference, $\Delta p$, at the load-sensing controller is connected with a setting means for determining the speed of movement of the consuming device.

According to another embodiment of the invention, the throttle is actuated manually and a sensor for determining the size of the opening of the throttle is provided which is connected with an electronic control unit for controlling the pressure difference, $\Delta p$, at the load-sensing controller.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
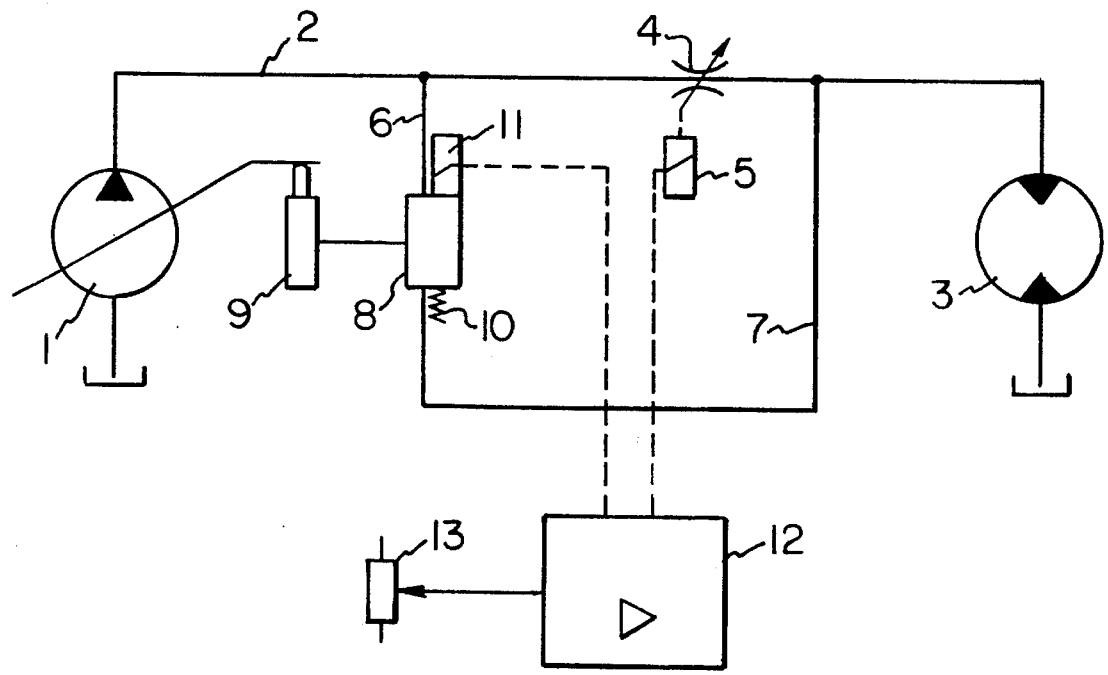
FIG. 1 is a control circuit for a hydrostatic drive system according to a first embodiment of the invention.

The hydrostatic drive system shown in FIG. 1 of the drawings includes an adjustable hydrostatic pump 1 connected to a sump and to a hydraulic fluid delivery line 2 which is connected to a hydraulic energy consuming device 3 such as a motor. An adjustable throttle 4 is located in delivery line 2 between pump 1 and hydraulic energy consuming device 3 to regulate the flow of hydraulic fluid from the pump to the hydraulic energy consuming device. The size of the opening in throttle 4 is regulated by a solenoid 5 in the embodiment shown in FIG. 1 of the drawings. The pressure of the hydraulic fluid in delivery line 2 upstream of throttle 4 and the pressure of the hydraulic fluid in delivery line 2 downstream of throttle 4 are transmitted to a load-sensing controller 8 by sensing lines 6 and 7, respectively. The sensing lines are connected to hydraulic fluid delivery line 2 on opposite sides of throttle 4. Load-sensing controller 8 is operatively connected with a piston 9 which controls the displacement of pump 1. Load-sensing controller 8 adjusts piston 9 to set the pump displacement to produce a constant pressure drop, $\Delta p$, at throttle 4. The displacement of pump 1 is always set so that the delivery pressure of pump 1 upstream of throttle 4 exceeds the pressure downstream of throttle 4 which is the pressure applied to hydraulic consuming device 3 by a pressure difference, $\Delta p$. The pressure difference, $\Delta p$, is determined partly by the force of a spring 10 acting on load-sensing controller 8 and partly by a solenoid 11 acting on load-sensing controller 8 in opposition to the force of spring 10. Varying the force exerted by solenoid 11 adjusts load-sensing controller 8 to change the value of the pressure difference, $\Delta p$, by adjusting piston 9 to set the pump displacement.

Solenoid 5 of throttle 4 and solenoid 11 of load-sensing controller 8 are both connected to an electronic control unit 12. Electronic control unit 12 is also connected with a setting means 13, such as a potentiometer for setting the movement speed of hydraulic energy consuming device 3.

The pressure difference, $\Delta p$, produced by load-sensing controller 8 and the size of the opening of throttle 4 are automatically coordinated by electronic control unit 12 and, depending upon the movement speed of hydraulic energy consuming device 3, are set by setting means 13 to obtain fine control when low speeds of movement of consuming device 3 are required, and minimal loss of power at high speeds of movement of consuming device 3 without departing from the range of control.

Figure 2:
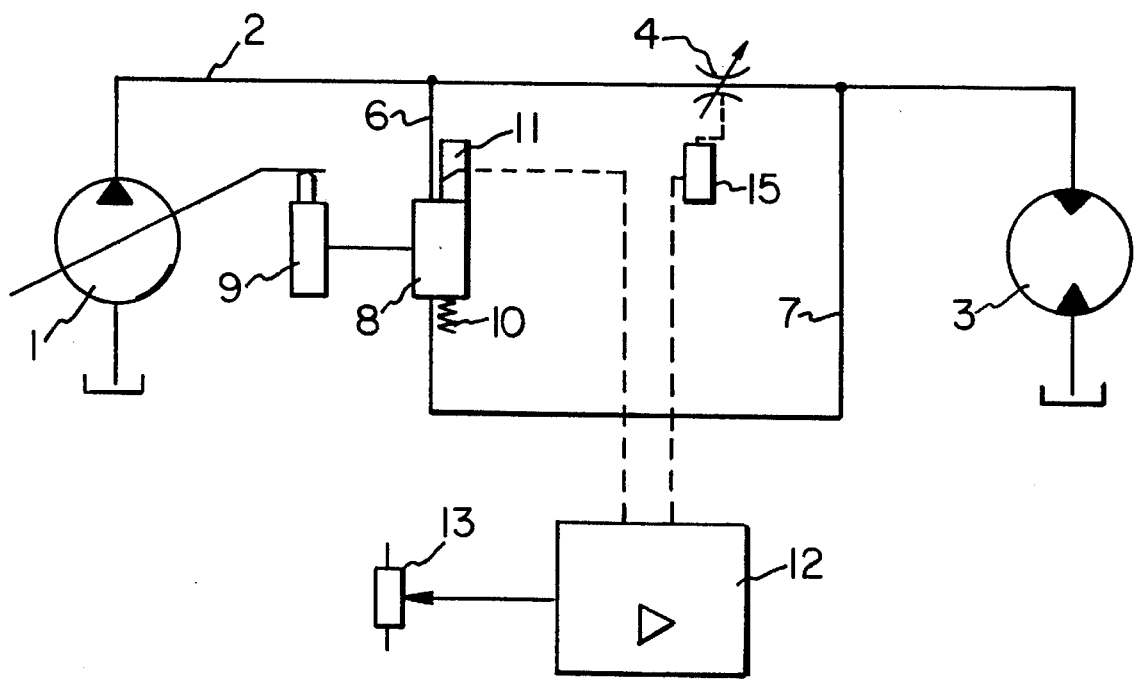
FIG. 2 is a control circuit for a hydrostatic drive system according to a second embodiment of the invention.

In the embodiment of the invention shown in FIG. 2 of the drawings, the size of the opening of throttle 4 is manually controlled, which is less expensive than using a solenoid as in the embodiment shown in FIG. 1 of the drawings. In this embodiment, the manually set size of the opening of throttle 4 is preferably determined by an analog sensor 15, and the size is communicated to electronic control unit 12 so that the displacement of pump 1 can be set to provide the pressure difference, $\Delta p$, corresponding to the selected size of the opening of the throttle. Alternatively, the sensor can be a two-position switch which indicates only whether a large opening or a small opening of the throttle has been selected, so that one of two predetermined characteristics can be selected. The setting of pump 1 is then adjusted accordingly.

Figure 3:
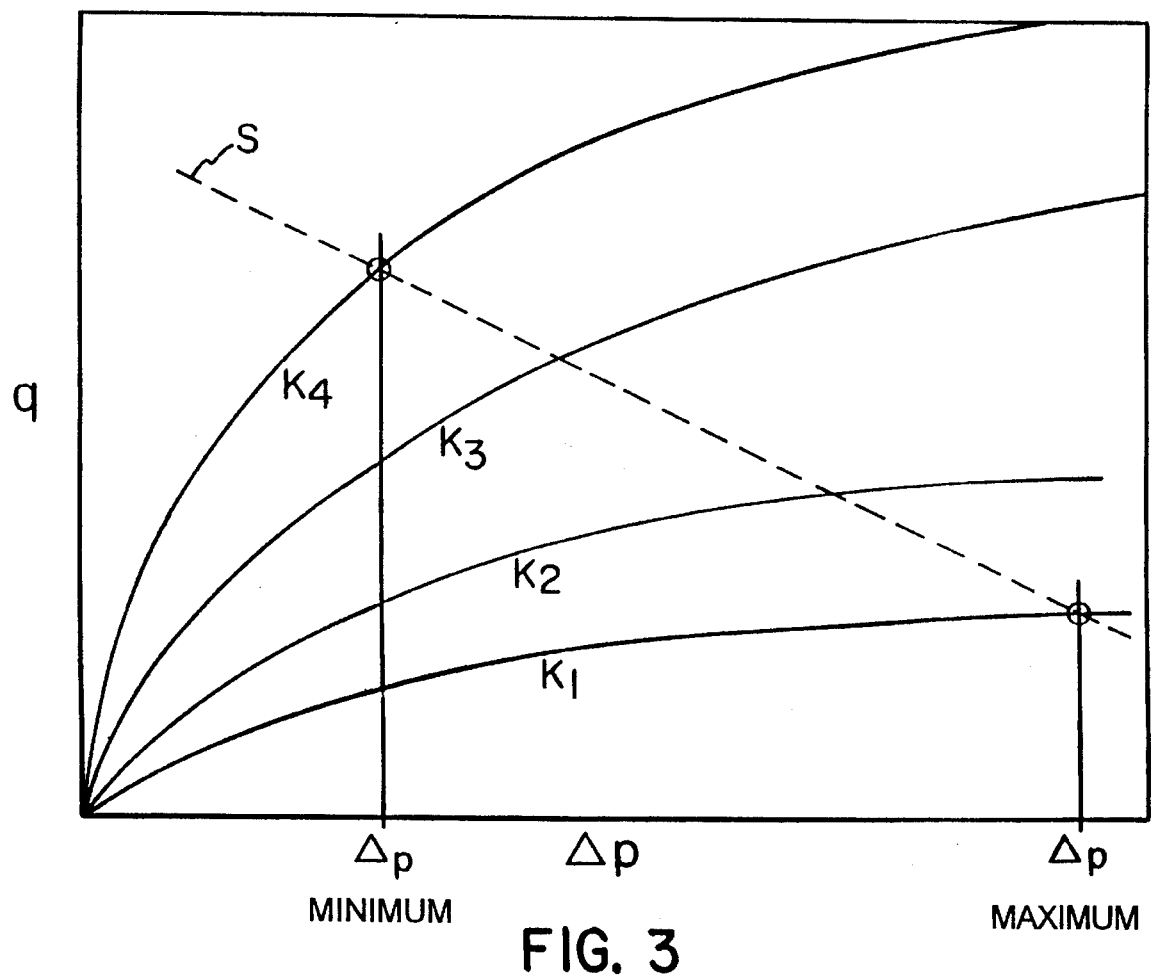
FIG. 3 is a graph showing the operation of the hydrostatic drive system according to the invention.

In the graph shown in FIG. 3 of the drawings, the pressure difference, $\Delta p$, is plotted on the abscissa and the rate of flow, q, of hydraulic fluid through throttle valve 4 is plotted on the ordinate. Each of the four characteristic curves, K1 to K4, corresponds to a certain size of the opening of throttle 4. The characteristic curves show the relationship between the flow of hydraulic fluid through throttle 4 and the pressure difference, $\Delta p$, at four different sizes of the opening of the throttle. Thus, curve K1 illustrates the flow relationship when the size of the opening of throttle 4 is small, and curve K4 illustrates the flow relationship when the size of the opening of throttle 4 is large. The curves designated K2 and K3 represent intermediate sizes of the opening of the throttle.

According to the invention, the pressure difference, $\Delta p$, and the size of the opening of throttle 4 are controlled in combination, so that the pressure difference and the size of the opening of throttle 4 are automatically coordinated with one another, for example, in accordance with the control characteristic S which is shown by the broken line in FIG. 3 of the drawings. Consequently, for slow movement speeds of hydraulic energy consuming device 3 a large pressure difference, $\Delta p$, is associated with a small size of the opening of throttle 4, as shown by the rate of flow, q, in order to obtain good, fine controllability. The flow through throttle 4 is low in this operating range, and the loss of power remains low in spite of the high pressure difference, $\Delta p$. At high movement speeds of consuming device 3, a large size opening of throttle 4, as shown by the rate of flow, q, is associated with a small pressure difference, $\Delta p$, according to control characteristic S. Thus, controllability is maintained and the loss of power is minimal.

The foregoing describes preferred embodiments of the invention and is given by way of example only. The invention is not limited to any of the specific features described herein, but includes all such variations thereof within the scope of the appended claims.

What is claimed is:

1. A method for operating an adjustable hydrostatic pump having an outlet in a drive system for a hydraulic energy consuming device having an inlet, said drive system includes a hydraulic fluid delivery line connecting said outlet of said pump and said inlet of said hydraulic energy consuming device, a throttle having an adjustable opening located in said hydraulic fluid delivery line between said outlet of said pump and said inlet of said hydraulic energy consuming device to create a pressure difference in said hydraulic fluid delivery line between said outlet of said pump and said inlet of said hydraulic energy consuming device, a load-sensing controller connected to said hydraulic fluid delivery line on opposite sides of said throttle and means operatively connected with said load-sensing controller for adjusting the delivery pressure of said pump, said method including measuring said pressure drop in said hydraulic fluid delivery line at said throttle, communicating said measured pressure drop to said load-sensing controller and controlling said means for adjusting the delivery pressure of said pump to adjust the displacement of said pump in accordance with said load-sensing controller to a value at which the delivery pressure of said pump exceeds the pressure at said hydraulic energy consuming device by a pressure difference determined by the size of the opening of said throttle, wherein the movement speed of said hydraulic energy consuming device is a set value and coordinating the pressure difference, $\Delta p$, and the size of the opening of said throttle in combination such that fine control of said hydraulic energy consuming device is obtained at low movement speeds with minimal loss of power of said hydraulic energy consuming device at high movement speeds.

2. A method according to claim 1 including communicating the set value for the movement speed of said hydraulic energy consuming device to an electronic control unit and controlling the size of the opening of said throttle and the pressure difference, $\Delta p$, at said load-sensing controller by signals from said electronic control unit.

3. A method according to claim 1 including adjusting said throttle and detecting the size of the opening of said throttle by a sensor, communicating said opening size from said sensor to an electronic control unit and controlling the pressure difference, $\Delta p$, at said load-sensing controller by signals from said electronic control unit.

4. A hydrostatic drive system including an adjustable pump having an outlet and at least one hydraulic energy consuming device having an inlet, a hydraulic fluid delivery line connecting said outlet of said pump and said inlet of said hydraulic energy consuming device, a throttle having an adjustable opening located in said hydraulic fluid delivery line between said outlet of said pump and said inlet of said hydraulic energy consuming device, load-sensing controller means connected to said hydraulic fluid delivery line on opposite sides of said throttle and operatively connected to said pump for controlling the displacement of said pump and for reproducing the pressure drop at said throttle, means for providing a set value for the speed of movement of said hydraulic energy consuming device wherein the pressure difference, $\Delta p$, and the size of said adjustable opening of said throttle can be coordinated in accordance with a speed of movement of said hydraulic energy consuming device, wherein a certain pressure difference, $\Delta p$, and a certain throttle opening size are automatically associated with one another, whereby fine control of said hydraulic energy consuming device is obtained at low speeds of movement and minimal loss of power of said hydraulic energy consuming device is obtained at high speeds of movement.

5. A hydrostatic drive system according to claim 4, wherein said system includes electronic control means for controlling said opening size of said throttle and the pressure difference, $\Delta p$, at said load-sensing controller, and a setting means for determining the speed of movement of said hydraulic energy consuming device connected with said electronic control means.

6. A hydrostatic drive system according to claim 4 including a sensor connected to said throttle for measuring the opening size of said throttle and an electronic control means for controlling the pressure difference, $\Delta p$, at said load-sensing controller connected to said sensor, whereby the displacement of said pump is determined according to said pressure difference.

7. A method for operating an adjustable hydrostatic pump having an outlet in a drive system for a hydraulic energy consuming device having an inlet, said drive system includes a hydraulic fluid delivery line connecting said outlet of said pump and said inlet of said hydraulic energy consuming device, a throttle having an adjustable opening located in said hydraulic fluid delivery line between said outlet of said pump and said inlet of said hydraulic energy consuming device to create a pressure difference in said hydraulic fluid delivery line between said outlet of said pump and said inlet of said hydraulic energy consuming device, a load-sensing controller connected to said hydraulic fluid delivery line on opposite sides of said throttle and means operatively connected with said load-sensing controller for adjusting the delivery pressure of said pump, said method including measuring said pressure drop in said hydraulic fluid delivery line at said throttle, communicating said measured pressure drop to said load-sensing controller and controlling said means for adjusting the delivery pressure of said pump to adjust the displacement of said pump in accordance with said load-sensing controller to a value at which the delivery pressure of said pump exceeds the pressure at said hydraulic energy consuming device by a pressure difference determined by the size of said opening of said throttle, wherein the movement speed of said hydraulic energy consuming device is a set value and communicating said set value of the movement speed of said hydraulic energy consuming device to an electronic control unit and controlling the size of said opening of said throttle and the pressure difference, $\Delta p$, at said load-sensing controller by signals from said electronic control unit such that fine control of said hydraulic energy consuming device is obtained at low movement speeds with minimal loss of power of said hydraulic energy consuming device at high movement speeds.

8. A method according to claim 7 including adjusting said opening of said throttle and detecting the size of said opening of said throttle by a sensor, communicating said opening size of said throttle from said sensor to an electronic control unit and controlling the pressure difference, $\Delta p$, at said load-sensing controller by signals from said electronic control unit.

9. A hydrostatic drive system including an adjustable pump having an outlet and at least one hydraulic energy consuming device having an inlet, a hydraulic fluid delivery line connecting said outlet of said pump and said inlet of said hydraulic energy consuming device, a throttle having an adjustable opening located in said hydraulic fluid delivery line between said outlet of said pump and said inlet of said hydraulic energy consuming device, load-sensing controller means connected to said hydraulic fluid delivery line on opposite sides of said throttle and operatively connected to said pump for determining the displacement of said pump and for reproducing the pressure drop at said throttle, means for controlling said opening size of said throttle and the pressure difference, $\Delta p$, at said load-sensing controller, and a setting means for determining the speed of movement of said hydraulic energy consuming device connected with said electronic control means, wherein the pressure difference, $\Delta p$, and the size of said opening of said throttle can be coordinated in accordance with the speed of movement of said hydraulic energy consuming device which is determined as a set value, and a certain pressure difference, $\Delta p$, and a certain throttle opening size are automatically associated with one another, whereby fine control of said hydraulic energy consuming device is obtained at low speeds of movement and minimal loss of power of said hydraulic energy consuming device is obtained at high speeds of movement.

10. A hydrostatic drive system according to claim 9 including a sensor connected to said throttle for measuring the size of said opening of said throttle and an electronic control means for controlling the pressure difference, $\Delta p$, at said load-sensing controller connected to said sensor, whereby the displacement of said pump is determined according to said pressure difference.

* * * * *